May 20, 1947.  C. L. EASTBURG  2,420,820
ROLLER BEARING
Filed May 3, 1945
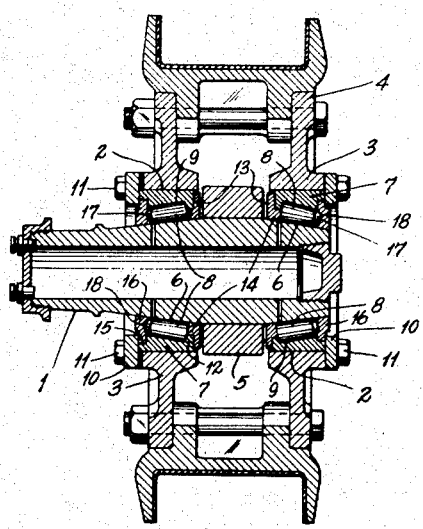
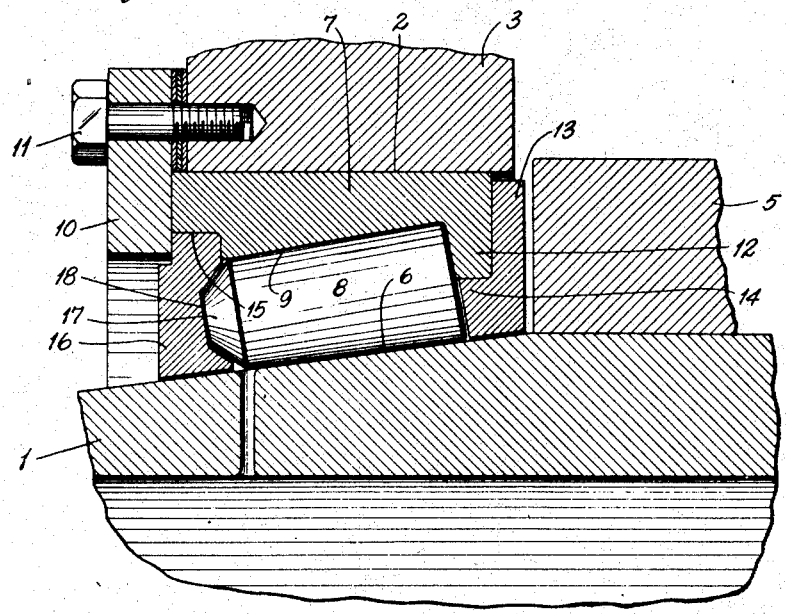
INVENTOR:
Clifford L. Eastburg,
by Carr Kerr Gravely,
HIS ATTORNEYS.

Patented May 20, 1947

2,420,820

UNITED STATES PATENT OFFICE 2,420,820

ROLLER BEARING

Clifford L. Eastburg, Canton, Ohio, assignor to The Timken Roller Bearing Company, Canton, Ohio, a corporation of Ohio Application May 3, 1945, Serial No. 591,652

3 Claims. (Cl. 308—214)

This invention relates to improvements in roller bearings, particularly roller crosshead bearings of the type shown in Buckwalter Patent No. 2,180,315 of November 14, 1939. The objects of my improvement are to make a self-contained unit of the cup, rollers and end closures of the above type of roller bearing and to increase the length of the cup without increasing the over-all length of the bearing. The invention consists principally in reducing one end of the bearing rollers, press-fitting both annular end closure plates in the bearing cup and providing the annular closure at the reduced ends of the rollers with an annular groove adapted to receive and retain said ends of said rollers, whereby said cup, roller and annular closure assembly are adapted for handling, application and removal as a complete self-contained unit. The invention also consists in providing the cup with a counterbored seat for the grooved annular closure; and it also consists in making the reduced ends of the rollers of conical shape and in inclining the sides of the annular groove conformably to the slope of said conical ends of said rollers. The invention also consists in the unit-handled roller bearing assembly and in the parts, combinations and arrangement of parts hereinafter described and claimed.

In the accompanying drawing, wherein like symbols refer to like parts wherever they occur, Fig. 1 is a vertical cross-sectional view of a locomotive crosshead provided with a taper roller bearing embodying my invention; and Fig. 2 is an enlarged fragmentary sectional view of the roller bearing and the parts of the crosshead immediately associated therewith.

Fig. 1 illustrates a locomotive crosshead bearing of the type shown in Buckwalter Patent No. 2,180,315 wherein a wrist pin 1 extends through alined horizontal openings 2 in the spaced arms 3 of the crosshead yoke member 4 and is press-fitted in an opening in the locomotive main rod 5 which is disposed between said yoke arms. The wrist pin 1 has portions that taper away from the rod and constitute inner raceways 6 of the taper roller bearings of the crosshead.

Each of said taper roller bearings comprises a cup or outer bearing member 7 mounted in the opening 2 in an arm 3 of the yoke member 4 and a circular series of taper rollers 8 running on a tapered raceway portion 6 of the wrist pin 1 and on the tapered raceway portion 9 formed by the tapered bore of said cup. The cup 7 is held in the opening 2 in the arm 3 of the yoke 4 preferably by means of an annular retainer plate 10 which is secured by cap screws 11 to the outer face of said arm and overlaps the outer end of said cup. The cup 7 has an internal thrust rib 12 at the large end of the conical raceway 9 for engagement with the large ends of the taper rollers 8. The outer end face of the thrust rib 12 is covered and protected by an annular wear and closure plate 13 of bronze or other friction resistant metal, said plate extending into proximity with the raceway portion 6 of the wrist pin 1 and having an annular flange 14 on its inner face which is pressed into the inner periphery of the thrust rib, thereby securely holding the wear plate in the cup 7. Preferably, the inner face of the annular flange 14 is spaced away from the ends of the rollers 8. By this arrangement, should there be engagement of the wear plate 13 and the locomotive main rod 5, the wear plate will withstand rubbing engagement without damage to either the wear plate or the rod.

The smaller or outer end of the tapered raceway portion 9 of the cup 7 is counterbored, as at 15; and said end of said cup is closed by an annular closure plate 16 that is press-fitted in said counterbore and seats endwise against the annular shoulder formed thereby. As shown in the drawing, the annular retaining plate 10 preferably also overlaps the outer marginal portion of the annular closure plate 16 so as to prevent displacement thereof by any abnormal accidental force. The annular end closure plate 16, like the annular end closure and wear plate 13, extends into close proximity to the raceway portion 6 of the wrist pin 1 so as to retain lubricant in the bearing.

The taper bearing rollers 8 terminate at their small ends in reduced portions 17 of conical shape; and the inner, roller opposing face of the annular end closure 16 has an annular groove 18 therein adapted to receive the reduced conical end portions 17 of said rollers. The annular groove has its side walls inclined in conformity with the conical end portions 17 of the rollers 8.

By the arrangement described, the annular end closure plates 13 and 16 are press-fitted in opposite ends of the cup 7 and the rollers 8 have their conical ends 17 disposed in the annular groove 18 in said annular closure plate 16 and are thus retained in said cup in operative relation to the tapered raceway portion 9 thereof. Thus, the cup, rollers, and closure plate and wear plate are all held together in proper assembled relation for unit handling and for application to and removal from the crosshead as a complete preassembled unit. The cup 7 is lengthened to provide space for the counterbored seat 15 for the annular closure member 16, thereby increasing the length of the support for the cup in the crosshead without increasing the over-all length of the bearing.

What I claim is:

1. A self-contained roller bearing unit comprising a cup having a raceway bore therein with an integral internal thrust rib at one end of said raceway and a plain cylindrical counterbore at the other end thereof, a solid rigid annular closure member press-fitted in said counterbore and occupying the full depth thereof, and rollers running on said raceway between said thrust rib and annular closure member, said annular closure member having an annular groove in the roller opposing face thereof, said rollers having the ends thereof adjacent to said annular closure member disposed in the annular groove therein.

2. A self-contained roller bearing unit comprising a cup having a taper raceway bore with a plain cylindrical counterbore at one end of said raceway and an integral internal rib at the opposite end thereof, a solid rigid annular closure member press-fitted in said counterbore and occupying the full depth thereof, and rollers running on said raceway between said rib and said annular closure member, said annular closure member having an annular groove formed entirely in the roller opposing face thereof, said rollers having conical end portions disposed in the annular groove of said annular closure member, said annular groove having inclined side walls conforming to the conical ends of said rollers.

3. A self-contained taper roller bearing unit comprising a cup having a taper raceway bore therein with an integral internal thrust rib at the large end of said raceway and a plain cylindrical counterbore at the small end thereof, a solid rigid annular closure member press-fitted into said counterbore and occupying the full depth thereof, taper rollers running on said raceway between said thrust rib and annular closure member, an annular friction plate covering the outer end face of said thrust rib and having an annular flange press-fitted into the inner periphery of said thrust rib, said annular closure member having an annular groove in the roller opposing face thereof, said rollers having conical end portions disposed in the annular groove in said annular closure member, said groove having inclined side walls conforming to the conical ends of said rollers.

CLIFFORD L. EASTBURG.

REFERENCES CITED

The following references are of record in the file of this patent:

UNITED STATES PATENTS

| Number | Name | Date |
|---|---|---|
| 2,180,315 | Buckwalter | Nov. 14, 1939 |
| 2,198,376 | Cederberg | Apr. 23, 1940 |
| 1,992,682 | Walters | Feb. 26, 1935 |
| 2,024,206 | Buel | Dec. 17, 1935 |
| 2,071,797 | Kifer | Feb. 23, 1937 |
| 986,453 | Gillette | Mar. 14, 1911 |

FOREIGN PATENTS

| Number | Country | Date |
|---|---|---|
| 812,175 | France | May 1, 1937 |